United States Patent
Chen

(10) Patent No.: US 7,542,403 B2
(45) Date of Patent: Jun. 2, 2009

(54) OPTICAL DATA STORAGE SYSTEM

(75) Inventor: Ga-Lane Chen, Fullerton, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 734 days.

(21) Appl. No.: 11/218,155

(22) Filed: Sep. 1, 2005

(65) Prior Publication Data

US 2006/0062102 A1    Mar. 23, 2006

(30) Foreign Application Priority Data

Sep. 3, 2004    (TW) .............................. 93126625 A

(51) Int. Cl.
*G11B 7/00* (2006.01)
(52) U.S. Cl. .................. 369/126; 369/112.23
(58) Field of Classification Search ................. 369/288, 369/13.33, 126, 118, 112.23
See application file for complete search history.

(56) References Cited

U.S. PATENT DOCUMENTS 6,798,732 B2    9/2004    Lee et al.
6,850,480 B1 *  2/2005    Naito et al. .................. 369/288
7,327,665 B2 *  2/2008    Anatoliy et al. ............. 369/126
7,406,005 B2 *  7/2008    Hasegawa ................. 369/13.33

FOREIGN PATENT DOCUMENTS

JP    2001-014716    1/2001

* cited by examiner

*Primary Examiner*—Nabil Z Hindi

(57) ABSTRACT

An optical data storage system includes a light emitting and receiving device (30), a light transmission device (31) having an input port (32) and an output port (33). The input port is disposed adjacent to the light emitting and receiving device. Furthermore, a micro window is provided at the output port, and a diameter of the micro window is in a range of 5 to 70 nanometers. Therefore, in the optical data storage system, the spot size of the light beams is close to the diameter of the micro window. Accordingly, the size of the beam spot is small enough to write information at a higher density with respect to an optical storage medium.

17 Claims, 2 Drawing Sheets

OPTICAL DATA STORAGE SYSTEM

BACKGROUND

1. Field of the Invention

The present invention relates to an optical data storage system, and more particularly to a near-field optical data storage system which can write or read information at high density with respect to an optical storage medium.

2. General Background

An optical data storage system mainly includes an optical pickup and a near-field. The optical pickup has a solid immersion optical system or a solid immersion lens. The near-field is provided between the solid immersion optical system or solid immersion lens and the optical data storage medium. The optical pickup using the near-field performs writing and/or reading of information with respect to the optical data storage medium.

Referring to FIG. 4, a conventional optical data storage system includes a light transmission and reception portion 20, a reflective mirror 22, a focusing objective lens 24, and a refractive solid immersion lens 26 supported by a slider 28. The optical storage medium 18 includes a substrate 181, a protective layer 183, and a recording layer (not shown) between the substrate 181 and the protective layer 183. The slider 28 aerodynamically floats the solid immersion lens 26, whereby an air gap is formed between the solid immersion lens 26 and the optical storage medium 18. The air gap is an interval within one wavelength of the light used. In the optical data storage system, a near-field generating portion is defined at a predetermined position on the surface of the solid immersion lens 26 which opposes the optical storage medium 18. A beam spot is formed in the near-field generating portion.

In operation, the light transmission and reception portion 20 emits light beams having an optimized spread-width for the objective lens 24, the reflective mirror 22 reflects the light beams toward the objective lens 24, and the objective lens 24 focuses the light beams on the solid immersion lens 26. In the case that the interval of the air gap is sufficiently smaller than one wavelength of the light beams, such as $\lambda/4$, the spot size of the light beams incident to the optical storage medium 18 is close to the size of the beam spot formed in the near-field generating portion. Therefore, the optical data storage system can write or read information with respect to the recording layer of the optical storage medium 18, using the solid immersion lens 26.

However, because the spot size of the light beams incident to the optical storage medium 18 is close to the size of the beam spot formed in the near-field generating portion, the size of the beam spot is too large to write or read information at higher density with respect to the optical storage medium 18.

What is needed, therefore, is an optical data storage system which can write or read information at higher density with respect to the optical storage medium.

SUMMARY

In a preferred embodiment of the present invention, an optical data storage system includes a light emitting and receiving device, a light transmission device having an input port and an output port. The input port is disposed adjacent to the light emitting and receiving device. Furthermore, a micro window is provided at the output port, and a diameter of the micro window is in a range of 5 to 70 nanometers.

In a second embodiment of the present invention, an optical data storage system includes a light source, and a light transmission device having an input port and an output port. The input port is disposed adjacent to the light source. Furthermore, a micro window is provided at the output port, and a diameter of the micro window is in a range of 5 to 70 nanometers.

In a third embodiment of the present invention, an optical data storage system includes a detector, and a light transmission device that has an input port and an output port. The input port is disposed adjacent to the detector. Furthermore, a micro window is provided at the output port, and a diameter of the micro window is in a range of 5 to 70 nanometers.

In the optical data storage system, the spot size of the light beams is close to the diameter of the micro window. Accordingly, the size of the beam spot is small enough to write information at a higher density with respect to an optical storage medium.

Other advantages and novel features of embodiments of the present invention will become more apparent from the following detailed description when taken in conjunction with the accompanying drawings; in which:

DETAILED DESCRIPTION OF PREFERRED EMBODIMENTS

Figure 1:
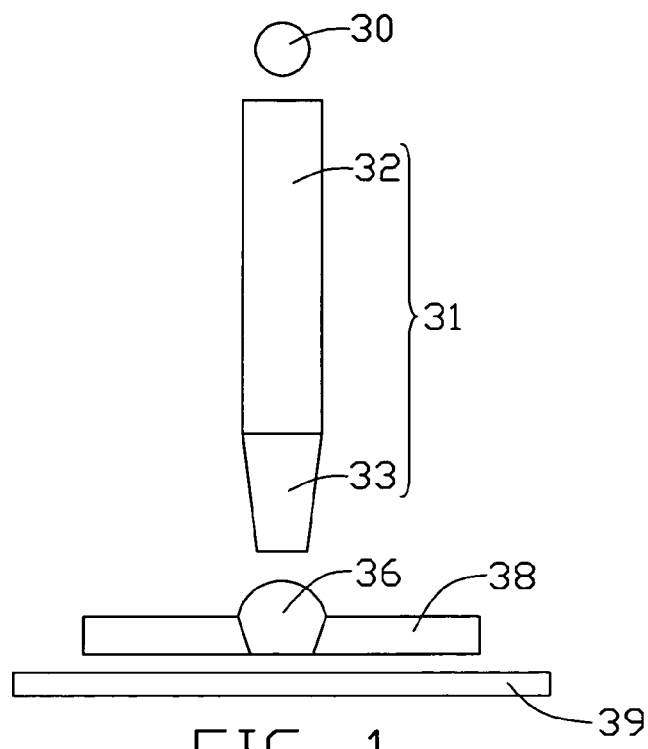
FIG. 1 is a schematic, enlarged side view of an optical data storage system of a first embodiment of the present invention, together with part of an optical storage medium.

Referring to FIG. 1, an optical data storage system of a first embodiment of the present invention includes a light processing device with a light source 30, a light transmission device like an optical fibre 31, and a solid immersion lens 36 supported by a slider 38. An optical storage medium 39 (only partly shown) is used together with the optical data storage system. Typically, the light source 30 may be part of an optical emitting and receiving device, i.e., the light processing device. The slider 38 aerodynamically floats the solid immersion lens 36 above the optical storage medium 39. Instead of the optical fibre 31, another kind of light transmission device of the art may be used. Instead of the solid immersion lens 36, another kind of optical focusing device of the art may be used.

The optical fibre 31 has an upper portion 32 and a lower portion 33. The upper portion 32 includes an input port (not labeled) disposed adjacent to the light source 30. The lower portion 33 includes an output port (not labeled) disposed adjacent to the solid immersion lens 36.

Figure 2:
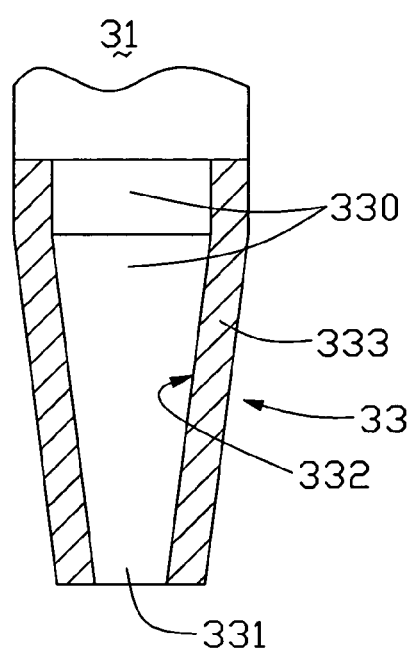
FIG. 2 is an enlarged, cut-away view of a lower portion of an optical fiber of the optical data storage system of FIG. 1.

Referring to FIG. 2, this is an enlarged, side cut-away view of the lower portion 33. The lower portion 33 is formed with the shape of a frustum of a cone by an FBT (Fused Biconical Taper) method or a chemical etching method. The lower portion 33 includes an exterior 333 and an interior 330. A micro window 331 is defined at a bottom of the interior 330, the micro window 331 being adjacent to the solid immersion lens 36. A diameter of the micro window 331 is in a range of 5 to 70 nanometers. A reflector 332 is provided on an inner surface of the exterior 333. Preferably, a material of the reflector is silver or aluminum.

Figure 3:
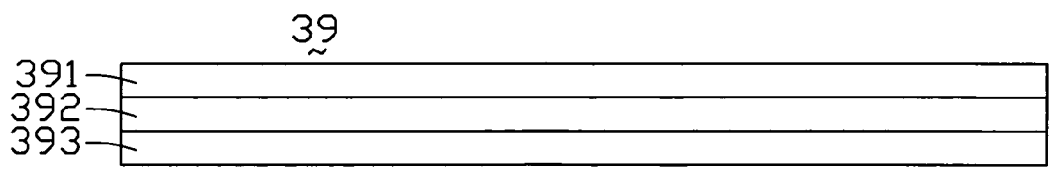
FIG. 3 is an enlarged, schematic, side cross-sectional view of the part of the optical storage medium of FIG. 1.
Figure 4:
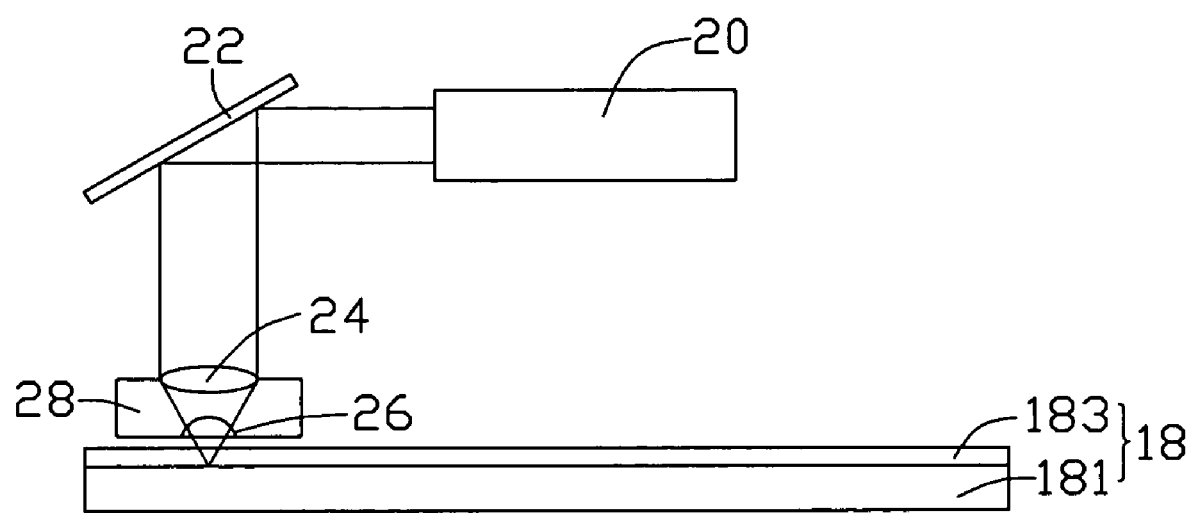
FIG. 4 is a schematic side view of a conventional optical data storage system together with an optical storage medium, showing essential optical paths thereof.

Referring to FIG. 3, this an enlarged, schematic, side cross-sectional view of the optical storage medium 39. The optical storage medium 39 includes a substrate 393, a protective layer 391, and a recording layer 392 between the substrate 393 and the protective layer 391. The protective layer 391 has a thickness in a range of 100 to 200 nanometers. A material of the protective layer 391 is glass or resin. The recording layer 392 has a thickness in a range of 10 to 20 nanometers. A material of the recording layer 392 is GeTeSb.

In operation, light beams emitted by the light source 30 irradiate the input port and enter the optical fibre 31. The incident light beams pass through the upper portion 32 and the lower portion 33, and emit from the micro window 331. The solid immersion lens 36 focuses the light beams emitted from the micro window 331, and writes information with respect to the optical storage medium 39. The reflector 332 on the inner surface of the exterior 333 can improve the utilization of light beams.

When the light beams have a wavelength in a range of 400 to 760 nanometers, the diameter of the micro window 331 should be controlled to be in a range of 10 to 70 nanometers. In such case, the light beams emitted from the micro window 331 generate a near-field between the lower portion 33 and the solid immersion lens 36, and prevent diffraction. When the light beams have a wavelength in a range of 200 to 300 nanometers, the diameter of the micro window 331 should be controlled to be in a range of 5 to 30 nanometers, so as to generate the near-field.

In each case, the spot size of the light beams incident to the optical storage medium 39 is close to the diameter of the micro window 331. Therefore the size of the beam spot is small enough to write information at a higher density with respect to the optical storage medium 39.

When the optical storage medium 39 is used together with the optical data storage system, the recording layer 392 is irradiated by the light beams emitted from the solid immersion lens 36, and a plurality of recording points having reflection functions are defined on the recording layer 392. A size of each recording point is close to the diameter of the micro window 331, therefore a recording density per inch of the recording layer 392 is about 100 Gigabits.

When reading information from the optical storage medium 39, an optical detector is positioned adjacent to the upper portion 32 of the optical fibre 31. Typically, the optical detector may be part of an optical emitting and receiving device or included in the above-mentioned light processing device. In this situation, the optical fibre 31 is used as an optical pick-up device. The micro window 331 functions as a nanometer probe, and receives reflective light beams from the recording point. The light beams pass through the lower portion 33 and the upper portion 32 and irradiate the optical detector. The optical detector receives the light beams, and transforms the light beams into electric signals. The electric signals are stored or output to a user in the form of information, a visual display, sound, etc.

When writing and/or reading information with respect to the optical storage medium 39, a light source (such as the light source 30) and an optical detector are used together as an optical emitting and receiving device.

In the optical data storage system, the spot size of the light beams incident to the optical storage medium is close to the diameter of the micro window. Thus, the size of the beam spot is small enough to write information at a higher density with respect to the optical storage medium.

The optical fibre having the micro window therein generates the near-field and prevents diffraction. Accordingly, the optical fibre can be used for optical processing involving nanometer dimensions. Using a light source having a predetermined wavelength and/or high power irradiation on an array of optical fibres, a predetermined pattern can be formed on the surface of a processing unit.

It is to be understood, however, that even though numerous characteristics and advantages of the present invention have been set forth in the foregoing description, together with details of the structure and function of the invention, the disclosure is illustrative only, and changes may be made in detail to the full extent indicated by the broad general meaning of the terms in which the appended claims are expressed.

I claim:

1. An optical data storage system, comprising:
   a light emitting and receiving device;
   a light transmission device having an input port and an output port, the input port being adjacent to the light emitting and receiving device; and
   a micro window provided at the output port, a diameter of the micro window being in a range of 5 to 30 nanometers when light transmitted in the light transmission device has a wavelength in a range of 200 to 300 nanometers.

2. The optical data storage system as claimed in claim 1, wherein the light transmission device is an optical fiber.

3. The optical data storage system as claimed in claim 1, further comprising an optical focusing device disposed adjacent to the micro window.

4. The optical data storage system as claimed in claim 3, wherein the optical focusing device is a solid immersion lens.

5. The optical data storage system as claimed in claim 4, further comprising a slider for aerodynamically floating the solid immersion lens rising on an optical storage medium.

6. An optical data storage system, comprising:
   a light processing device;
   a light transmission device having an input port and an output port, the input port being adjacent to the light processing device; and
   a micro window provided at the output port, a diameter of the micro window being in a range of 5 to 30 nanometers when light transmitted in the light transmission device has a wavelength in a range of 200 to 300 nanometers.

7. The optical data storage system as claimed in claim 6, wherein the light transmission device is an optical fiber.

8. The optical data storage system as claimed in claim 6, further comprising an optical focusing device disposed adjacent to the micro window.

9. The optical data storage system as claimed in claim 6, wherein said light processing device comprises at least one of a light source and a light detector.

10. A method to transmit light in a system, comprising the steps of:
    generating light transmissible in a system;
    transmitting said light toward a medium of said system; and
    urging said light to pass through a nano-scale micro window before said light is transmitted to reach said medium, a diameter of the micro window being in a range of 5 to 30 nanometers when said light has a wavelength in a range of 200 to 300 nanometers.

11. The method as claimed in claim 10, further comprising the step of collecting reflective light from said medium via said micro window to generate information based on said reflective light.

12. The method as claimed in claim 10, wherein said micro window is formed at an end of an optical fiber which extends another end thereof toward a light source generating said light.

13. The method as claimed in claim 12, wherein said end of said optical fiber forming said micro window is a tapered end made by means of a selective one of a Fused Biconical Taper (FBT) method and a chemical etching method.

14. The method as claimed in claim 10, wherein said system is an optical data storage system and said medium is an optical storage medium.

15. The method as claimed in claim 10, wherein said light is transmitted toward said medium in a totally reflective way during said transmitting step.

16. The optical data storage system as claimed in claim 2, wherein said end of said optical fiber forming said micro window is a tapered end made by means of a Fused Biconical Taper (FBT) method.

17. The optical data storage system as claimed in claim 7, wherein said end of said optical fiber forming said micro window is a tapered end made by means of a Fused Biconical Taper (FBT) method.

* * * * *